US007801761B2

(12) United States Patent
Varadarajan et al.

(10) Patent No.: US 7,801,761 B2
(45) Date of Patent: Sep. 21, 2010

(54) SYSTEM AND METHOD FOR TRACKING CUSTOMER SATISFACTION INDEX BASED ON INTENTIONAL CONTEXT

(75) Inventors: Sridhar Varadarajan, Bangalore (IN); Korrapati Kalyana Rao, Bangalore (IN); Srividya Gopalan, Bangalore (IN); Amit Thawani, Bangalore (IN); Darshan Gujjar, Bangalore (IN)

(73) Assignee: Satyam Computer Services Ltd., Bangalore (IN)

( * ) Notice: Subject to any disclaimer, the term of this patent is extended or adjusted under 35 U.S.C. 154(b) by 1325 days.

(21) Appl. No.: 11/293,450

(22) Filed: Dec. 2, 2005

(65) Prior Publication Data

US 2007/0127692 A1 Jun. 7, 2007

(51) Int. Cl.
*G06F 17/30* (2006.01)
(52) U.S. Cl. ............................................. 705/10
(58) Field of Classification Search .................. 705/10
See application file for complete search history.

(56) References Cited

U.S. PATENT DOCUMENTS

| | | | | |
|---|---|---|---|---|
| 6,493,697 | B1 * | 12/2002 | Stier et al. | 706/50 |
| 6,687,696 | B2 | 2/2004 | Hofmann et al. | |
| 6,724,887 | B1 | 4/2004 | Eilbacher et al. | |
| 6,760,727 | B1 * | 7/2004 | Schroeder et al. | 707/10 |
| 6,904,449 | B1 * | 6/2005 | Quinones | 709/203 |
| 6,915,270 | B1 | 7/2005 | Young et al. | |
| 7,136,448 | B1 * | 11/2006 | Venkaterumal et al. | 379/265.02 |
| 7,340,408 | B1 * | 3/2008 | Drew et al. | 705/10 |
| 7,571,191 | B2 * | 8/2009 | Dill et al. | 707/200 |
| 2003/0158924 | A1 * | 8/2003 | DeLegge | 709/223 |
| 2003/0200135 | A1 * | 10/2003 | Wright | 705/10 |
| 2004/0039593 | A1 * | 2/2004 | Eskandari | 705/1 |

OTHER PUBLICATIONS

Amit Thawani, Srividya Gopalan, and Sridhar V, "Web-based Context Aware Information Retrieval in Contact Centers," Proceedings. IEEE/WIC/ACM International Conference on, Sep. 20-24, 2004 p. 473-476.*
Amit Thawani, Srividya Gopalan, and Sridhar V, "iTV Application for Intent Tracking", Proc. of Second European Conference on Interactive Television, 2004.*

(Continued)

*Primary Examiner*—Romain Jeanty
*Assistant Examiner*—George H Walker
(74) *Attorney, Agent, or Firm*—The Webb Law Firm

(57) ABSTRACT

Customers buy a variety of equipments and gadgets from multiple vendors and interact with manufacturers through contact centers to get their questions on the bought products answered. The market opportunities and competitiveness are forcing manufacturers to be accommodative and innovative in providing post-sale support. An essential aspect of this market dynamics is customer churn and the manufactures are required to ensure that product loyalty and brand loyalty of the customers are high. While Customer Relationship Management (CRM) has been playing an all important role of monitoring and managing customer relationships, it is necessary to augment CRM with more specific enhancements. The need is to have an integrated, practical, and realizable approach that focuses on measuring customer satisfaction index based on multiple interactions of customers with manufacturers. A system and method for tracking customer satisfaction index involves tracking of the intentional states of customers and assessing them just in time to help improve the satisfaction index.

4 Claims, 12 Drawing Sheets

OTHER PUBLICATIONS

Chatura Ranaweera and Jaideep Prabhu ("The influence of satisfaction, trust and switching barriers on customer retention in a continuous purchasing setting," International Journal of Service Industry Management, 2003, vol. 14, Iss 3 / 4, p. 374).*

HarishKammanahalli, Srividya Gopalan, and Sridhar V, "Context Aware Retrieval in Web-Based Collaborations," Proceedings of the Second IEEE Annual Conference on Pervasive Computing and Communications Workshops (PERCOMW'04), 2004.*

Jai Ganesh, "Managing customer preferences in a multi-channel environment using Web services," International Journal of Retail & Distribution Management; 2004; 32, 2/3; ABI/INFORM Global, p. 140.*

Michael J. Ryan, Thomas Buzas, and Venkatram Ramaswamy, "Making CSM a Power Tool," Marketing Research, : Summer 1995 vol. 7 No. 3, p. 11.*

* cited by examiner

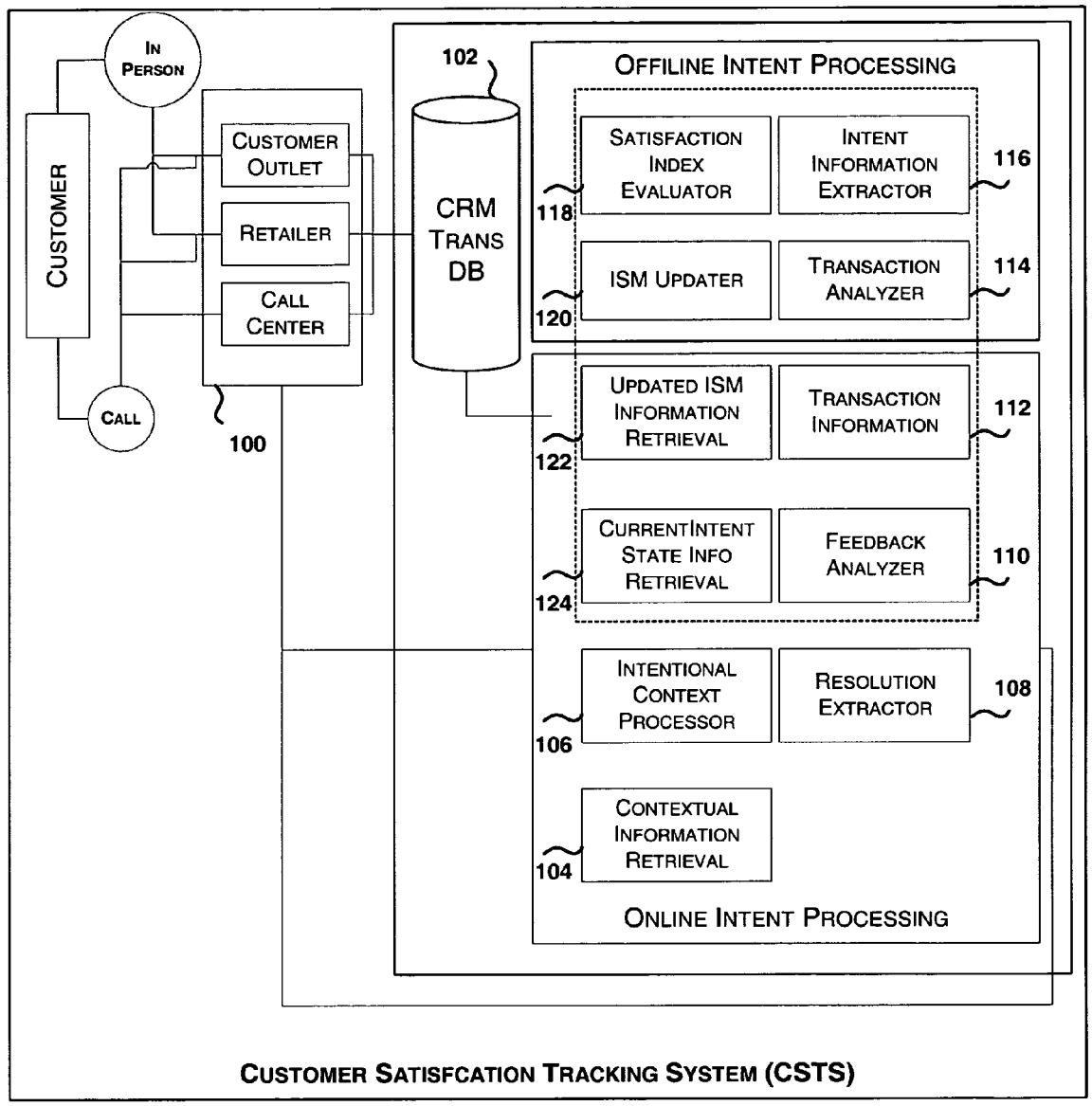
FIG. 1: SYSTEM ARCHITECTURE OF CSTS SYSTEM

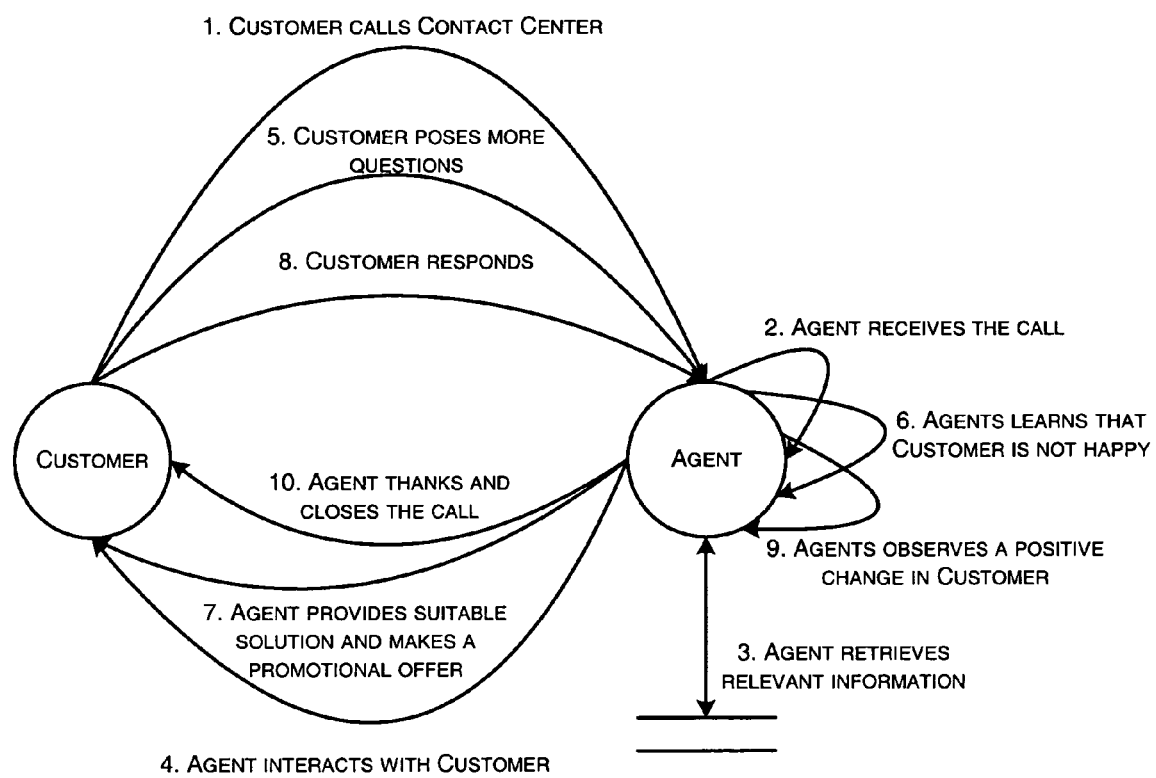
FIG. 2: A TYPICAL SCENARIO

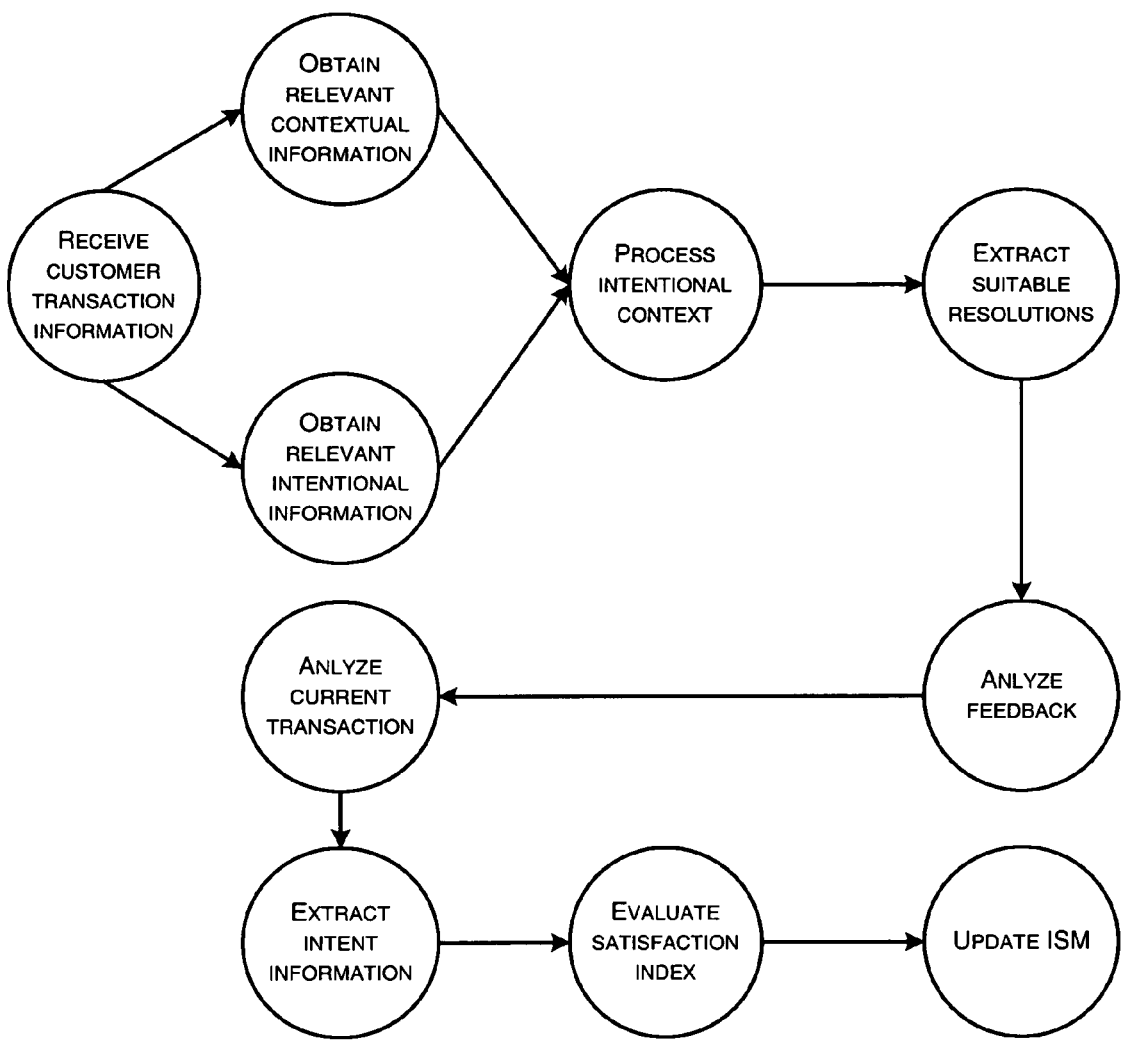
FIG. 3: A TYPICAL WORKFLOW

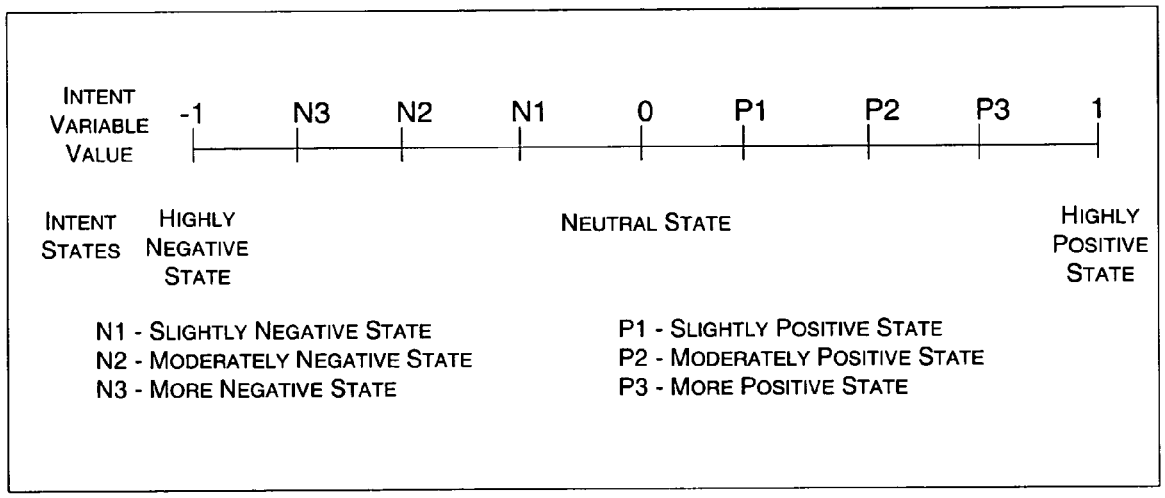
FIG. 4: POSSIBLE CUSTOMER STATES

| Sl. No. | Parameter | Remarks | Computational Procedure |
|---|---|---|---|
| 1. | Positive Transition Count (PTC) | For a customer, after transaction completion, count increased by one if the transaction analysis result is positive. | PTC += PS wherein PS = 1 if (WT < THRESHOLD AND RT < THRESHOLD AND RS = POSITIVE (AFTER MINING THE RESOLUTION) OR QS = RESOLVED) ELSE 0 |
| 2. | Negative Transition Count (NTC) | For a customer, after transaction completion, count increased by one if the transaction analysis result is negative. | NTC += NS wherein NS = 1 if (WT > THRESHOLD OR RT > THRESHOLD AND RS = NEGATIVE (AFTER MINING THE RESOLUTION) OR QS = PENDING) ELSE 0 |
| 3. | Total Transition Count (TTC) | For a customer, total number of transactions performed. | TTC = PTC + NTC |
| 4. | Intensity of Positive State (IPS) | For a customer, after transaction completion, count increased by one if transaction analysis result is positive AND previous transaction result was also positive. | IPS += 1 IF PS OF TRANSACTION(N) = 1 AND PS OF TRANSACTION(N-1) = 1 |
| 5. | Intensity of Negative State (INS) | For a customer, after transaction completion, count increased by one if transaction analysis result is negative AND previous transaction analysis result was also negative. | INS += 1 IF NS OF TRANSACTION(N) = 1 AND NS OF TRANSACTION(N-1) = 1 |
| 6. | Maximum Intensity Attained (MI) | Maximum of IPS or INS | MI = IPS IF IPS > INS ELSE INS |
| 7. | Number of Pending Tasks (NPT) | For a customer, after transaction completion, count increased by one if the transaction analysis states a pending task. | NPT += 1 IF QS = PENDING |
| 8. | Total Number of Tasks (TNT) | For a customer, total number of query resolution tasks requested | TNT +=1 IF Q=NEW QUERY |

FIG. 5: SOME TYPICAL INTENT PARAMETERS

| Sl. No. | Parameter | Remarks | Computational Procedure |
|---|---|---|---|
| 9. | Number of Products Purchased of Same Brand (NPS) | For a customer, after transaction completion, count increased by one if transactions details specify buy of product of the same brand. | NPS += 1 if RS = BUY (AFTER MINING THE RESOLUTION) |
| 10. | Number of Products Purchased from Competitors (NPC) | For a customer, after transaction completion, count increased by one if transactions details specify buy of product of a different brand. | NPC += 1 if Q = BUY (AFTER MINING THE RESOLUTION) AND REMARKS = OTHER PRODUCT (AFTER MINING THE REMARKS) |
| 11. | Number of Comparison Transactions (NCT) | For a customer, after transaction completion, count increased by one if transactions details specify comparison of products from different brands. | NCT += 1 if Q = COMPARE (AFTER MINING QUERY) AND PRODUCT P IS SUBSET OF BRAND AND OTHER PRODUCT IN Q IS NOT SUBSET OF BRAND |
| 12. | Number of New Product Enquiries (NPE) | For a customer, after transaction completion, count increased by one if transactions details specify enquiry of a new product | NPE += 1 if Q = NEW PRODUCT (AFTER MINING QUERY) |
| 13. | Customer Type (CT) | A constant factor determining the priority of customer which also takes into account agreement period | CT = 1 if customer is platinum customer else 0.75 if customer is gold customer else 0.5 if customer is silver customer else 0.25 |
| 14. | Query Satisfaction Factor (QSF) | Difference between total number of query resolution tasks requested and requests resolved | QSF = (TNT-NPT) |
| 15. | Transaction Satisfaction Factor (TSF) | Difference between total number of positive and negative transactions. | TSF = = (PTC-NTC) |
| 16. | Average Waiting Time (AWT) | Sum average of waiting time of all transactions for a customer. | AWT = (Sum of Transactions WT) / Number of Transactions |
| 17. | Average Resolution Time (ART) | Sum average of resolution time for each individual query of a customer. | ART = (Sum of Transactions RT) / Number of Transactions |

FIG. 6: SOME ADDITIONAL INTENT PARAMETERS

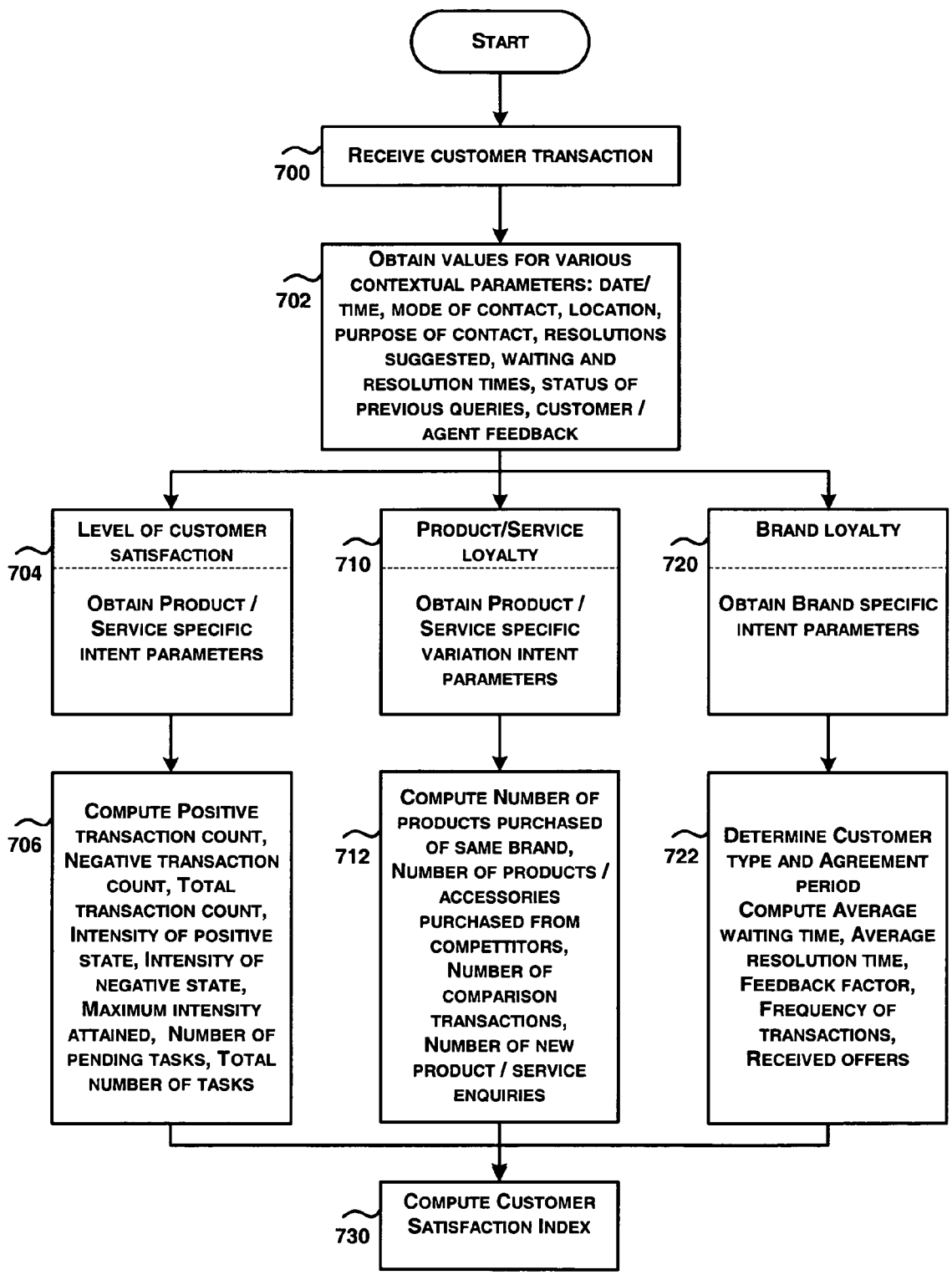
FIG. 7: INTENT CAPTURING

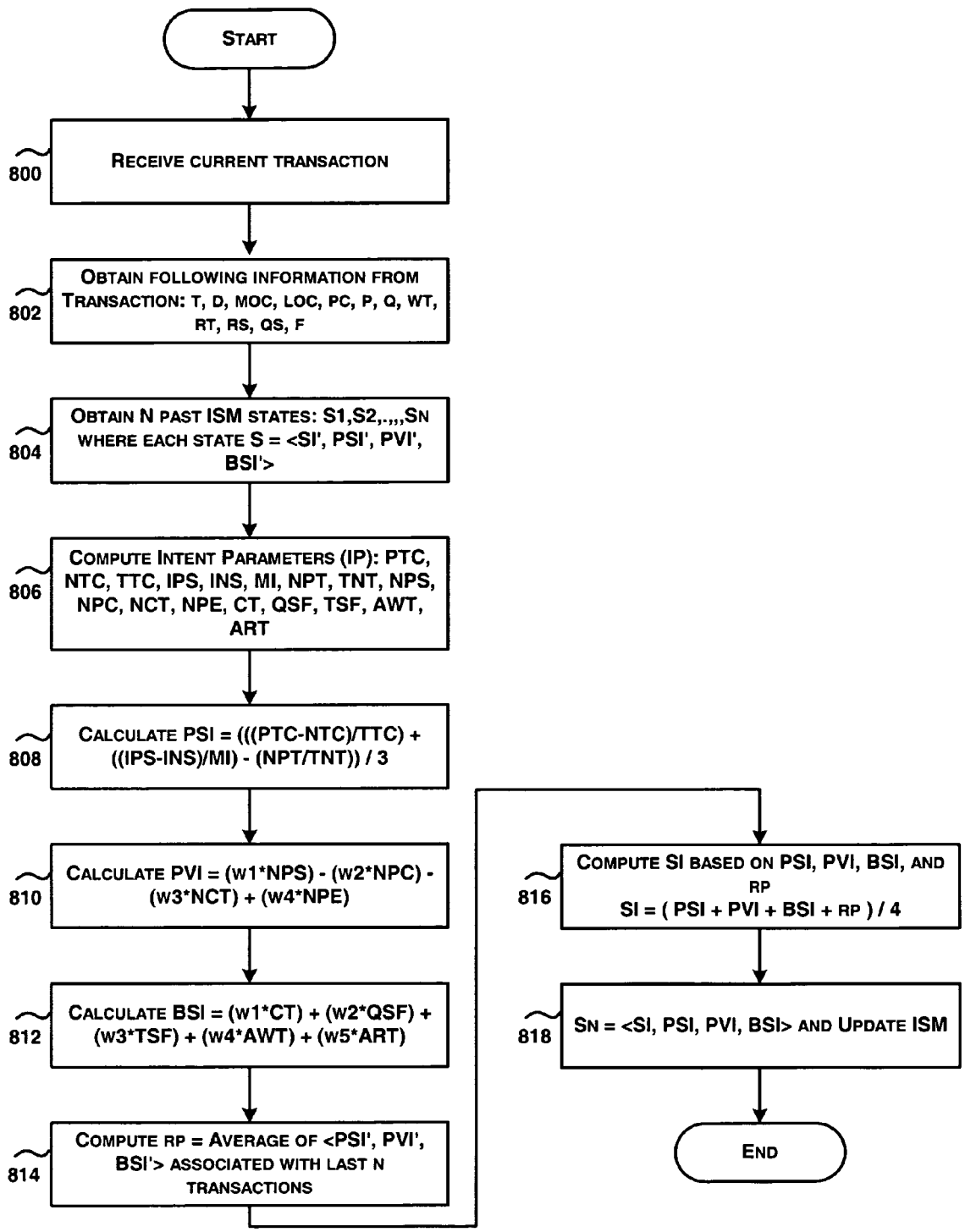
FIG. 8: INTENT PROCESSING

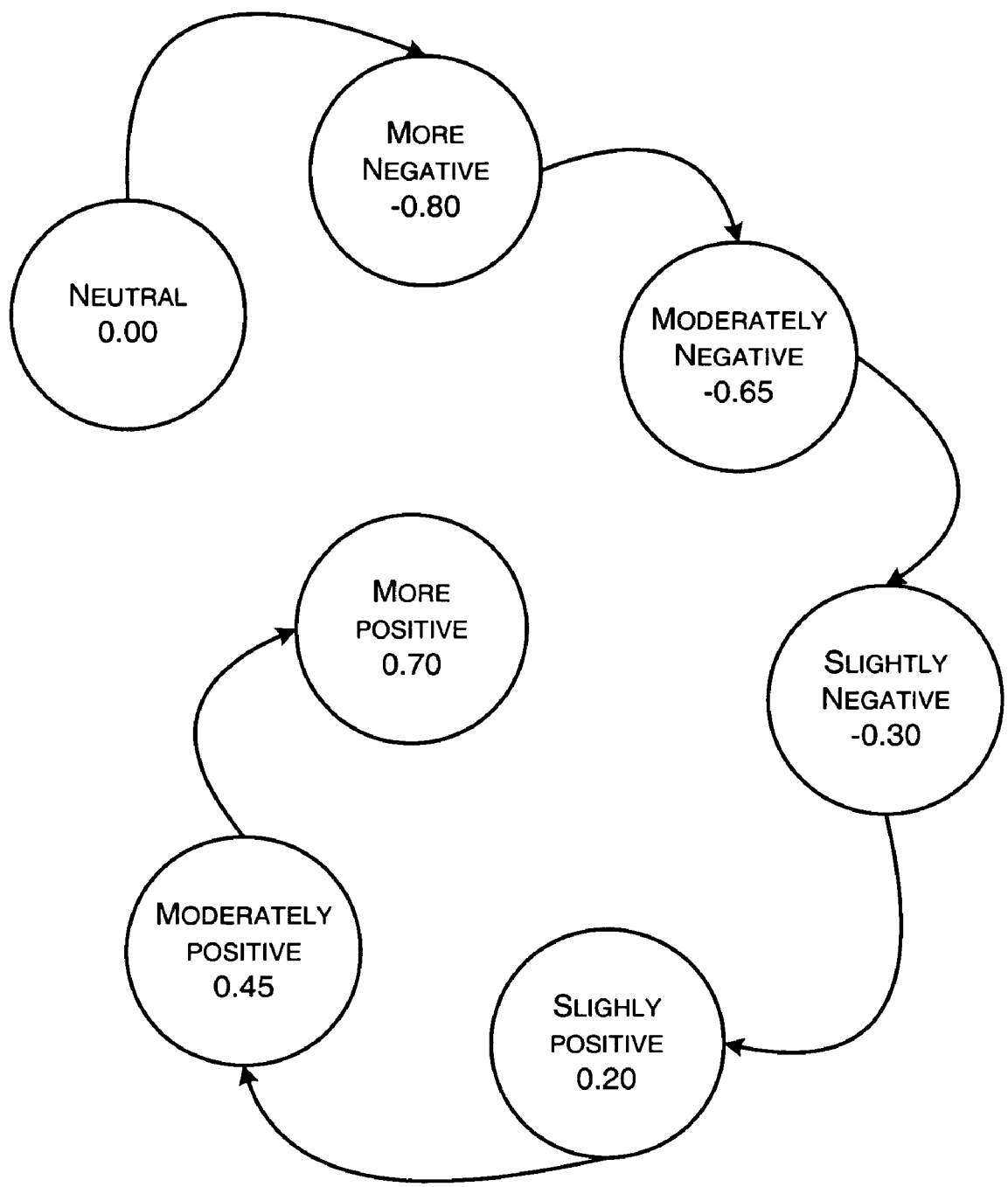
FIG. 9: AN ILLUSTRATIVE ISM

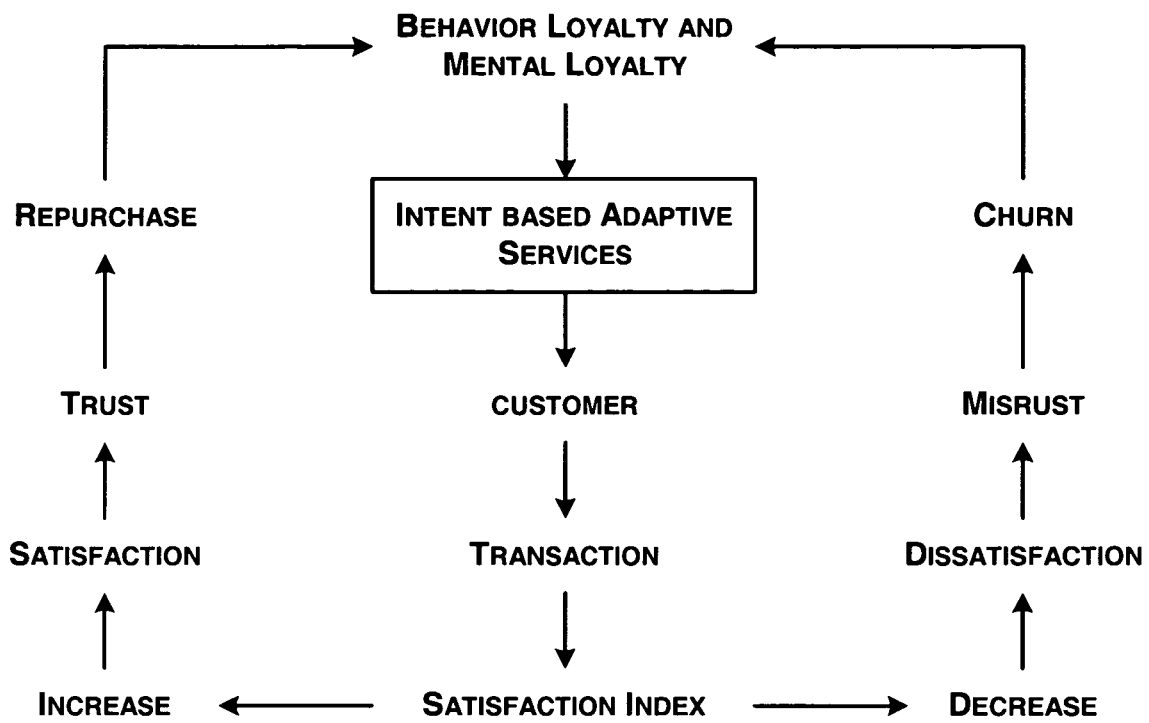
FIG. 10: CUSTOMER SATISFACTION LEVEL FLOW

| Trans. No | Date | Time | MOC | Product | Query | Resolution | Query Status | Feedback |
|---|---|---|---|---|---|---|---|---|
| 1 | 1/1 | Evening | Company Outlet | P1 from B1 | Product Purchase | Purchased | Resolved | Happy with Purchase |
| 2 | 3/1 | Evening | Call Center | P1 from B1 | Unable to Make Long-Distance Calls | Feature Not Enabled | Pending | Not Convinced |
| 3 | 5/1 | Afternoon | Call Center | P1 from B1 | Unable to Receive Incoming Calls | Temporary Network Problem | Pending | Not Convinced |
| 4 | 7/1 | Evening | Retailer | P2 from B1 | Product Purchase | Purchased | Resolved | Happy with Purchase |
| 5 | 8/1 | Morning | Call Center | P1 from B1 | Unable to Interconnect using Cable ABC | Makes Discount Offer on P3 | Resolved | Acquired Competitor Prod |
| 6 | 10/1 | Evening | Call Center | P3 from B1 | New Product Enquiry | Info Provided | Resolved | Interested in Product |

FIG. 11: AN ILLUSTRATIVE CUSTOMER INTERACTIONS

| Trans. No | PSI | PVI | BSI | SI | RP | ISM |
|---|---|---|---|---|---|---|
| 1 | 1 | 0.6 | 0.4 | 0.66 | 0 | 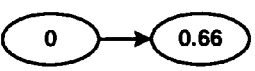 |
| 2 | -0.33 | 0.4 | -0.15 | -0.02 | 0 |  |
| 3 | -0.55 | 0.4 | -0.24 | -0.13 | 0 | 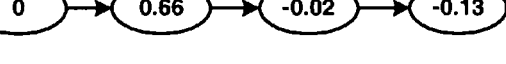 |
| 4 | 0.13 | 0.8 | 0.18 | 0.32 | 0.17 |  |
| 5 | -0.55 | 0.1 | -0.08 | -0.15 | 0.07 | 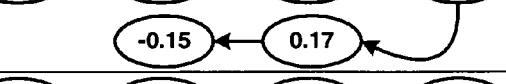 |
| 6 | 0.07 | 0.3 | 0.13 | 0.17 | 0.02 |  |
FIG. 12: AN ILLUSTRATIVE UPDATION OF ISM

SYSTEM AND METHOD FOR TRACKING CUSTOMER SATISFACTION INDEX BASED ON INTENTIONAL CONTEXT

FIELD OF THE INVENTION

The present invention relates to customer relationship management (CRM) in general, and more particularly, real-time assessment of customer satisfaction. Still more particularly, the present invention relates to the tracking of customer satisfaction index based on intentional contexts.

BACKGROUND OF THE INVENTION

Products and services companies are keen on knowing the customer behavioral patterns in planning their investment and enhancing their volume of businesses with the customers. From a customer perspective, the customer buys products and services of various brands from various outlets. During the course of the usage of these products and services over its lifecycle, the customer's satisfaction level typically varies from nightmarish experiences to being treated as a number one customer. CRM plays an important role in monitoring and assessing customer relationships and analytics usage provides a wealth of information. However, such information is based on statistical evaluation of data and is likely to be customer-intent insensitive. In order to have a consolidated view of this variation, the analysis needs to be performed in an integrated, customer-specific manner and further, this provides a richer insight into the customer's actions and reactions. One of the possibility is to undertake such an analysis based on information obtained during the interactions of the customer with a manufacturer.

DESCRIPTION OF RELATED ART

U.S. Pat. No. 6,724,887 to Eilbacher, R. et al for "Method and system for analyzing customer communications with a contact center" (issued on Apr. 20, 2004 and assigned to Verint Systems, Inc. (Melville, N.Y.)) describes the analysis of customer communications in contact centers to determine automatically whether the customer experience indicates a negative or unsatisfactory experience.

U.S. Pat. No. 6,687,696 to Hofmann, T. et al for "System and method for personalized search, information filtering, and for generating recommendations utilizing statistical latent class models" (issued on Feb. 3, 2004 and assigned to Recommind Inc. (Berkeley, Calif.)) describes a novel method for personalized filtering of information and automated generation of user-specific recommendations based on one or more statistical models learned from the available data.

U.S. Pat. No. 6,915,270 to Young, H. et al for "Customer relationship management business method" (issued on Jul. 5, 2005 and assigned to International Business Machines Corporation (Armonk, N.Y.)) describes a loyalty suite business method for building profitable customer relationships and the method is based on a combination of customer relationship management, business intelligence, and customer value management.

The known systems do not address the issue of assessing the customer satisfaction index based on the information related to the buy and use patterns of the various products and services. The present invention provides with an intention tracking system to help assess the satisfaction index based on information gathered during multiple interactions.

SUMMARY OF THE INVENTION

The primary objective of the invention is to achieve assessing of customer satisfaction index based on multiple customer interactions. This is achieved by capturing select parameters during each interaction and tracking the same during the course of the life cycle of a relationship of a customer with a manufacturer.

One aspect of the present invention is to process customer transactions received through different channels such as customer outlets, retailers, and contact centers.

Another aspect of the present invention is to extract and process the contextual information based on a customer transaction.

Yet another aspect of the present invention is to categorize intent information as product specific intent, product specific variation intent, and brand specific intent, and defining a set of trackable parameters for each of these categories of intent information.

Another aspect of the present invention is to extract and process the intent information based on a customer transaction.

Yet another aspect of the present invention is to process a customer transaction based on intentional context.

Another aspect of the present invention is to analyze a customer transaction and feedback obtained during the interaction.

Yet another aspect of the present invention is to evaluate satisfaction index based on a customer transaction.

Another aspect of the present invention is to update and manage customer specific intent state machines.

BRIEF DESCRIPTION OF THE DRAWINGS

FIG. 1 depicts the architecture of Customer Satisfaction Tracking System (CSTS).
FIG. 2 depicts a typical customer interaction scenario.
FIG. 3 depicts a typical workflow of CSTS.
FIG. 4 depicts a possible set of states of customer intent.
FIG. 5 provides a brief description of some typical intent parameters.
FIG. 6 provides a brief description of some additional intent parameters.
FIG. 7 describes the procedures related to intent capturing.
FIG. 8 describes the procedures related to intent processing.
FIG. 9 provides an illustrative ISM.
FIG. 10 describes a typical customer satisfaction level flow.
FIG. 11 provides an illustrative customer interactions.
FIG. 12 describes an illustrative updation of ISM.

DETAILED DESCRIPTION OF THE PREFERRED EMBODIMENTS

FIG. 1 depicts a high level system architecture of Customer Satisfaction Tracking System (CSTS). The main objectives of CSTS are (a) to process intentional context to help resolve customer queries satisfactorily; (b) to extract and process intent related parameters; (c) to evaluate customer satisfaction index; and (d) to maintain customer specific intent state machines (ISMs).

A customer buys a product/service through various channels such as retail stores and company outlets, and interacts with contact centers to obtain more information about the bought products, to get the problems with bought products resolved, and to obtain information about new products. Observe that, typically, a contact center caters to a particular product/service or a set of products/services from a manufacturer. As the customer uses the bought product, the customer's experience as compared with the expectation could vary from a perfect match to a perfect mismatch. It is essential to determine if the customer's expectations have not been perfectly met as this could lead to a poor customer relationship and ultimately leading to customer churn. It has been observed that there are enough pointers pointing to the possibility of customer churn much before actual churn occurs, and it is required to identify these pointers and take adequate steps to help improve the customer relationship. One such opportunity is to analyze the customer's transactions/queries in stores and to contact centers and offer suitable resolutions to the customer problems. The present invention describes an approach based on intent related parameters to continuously track customer satisfaction index.

A customer interacts to query about and buy products through various channels such as retail stores and contact centers (100). The customer query and interactions get stored in a CRM database for further analysis using analytical techniques (102). When a customer transaction (or query) is received, it is required to identify the context of the customer transaction in order to perform a better analysis and provide better resolution. Typical contextual information includes (a) date and time of transaction; (b) mode of contact; (c) location information; (d) purpose of contact (query information); (e) resolutions suggested; (f) waiting time and resolution time; (g) query status; and (h) customer and agent feedback. The contextual information relevant to the customer query is retrieved (104). The transaction information along with contextual information is processed along with intent parameters (106). Typical intent parameters include (a) product/service specific intent parameters: these parameters depict the level of customer satisfaction and the parameters considered in the present invention are positive transaction count, negative transaction count, total transaction count, intensity of positive state, intensity of negative state, maximum intensity attained, number of pending queries, and total number of tasks; (b) product/service variation intent parameters: these parameters depict the level of loyalty with respect to a product/service and the parameters considered in the present invention are the number of products/services purchased of the same brand, number of products/accessories purchased from competitors, number of product comparison transactions, and number of new product enquires; and (c) brand specific intent parameters: these parameters depict the level of customer satisfaction with respect to a brand and the parameters considered in the present invention are customer type (that includes agreement period), average waiting time and resolution time, feedback factor, frequency of transactions, and offers received. Based on the intentional context based processing, suitable resolutions are suggested (108) and the obtained feedback is analyzed (110) so as to compute the various intent parameters. The transaction information is obtained (112) and is analyzed to compute additional intent parameters (114). Based on the transaction information, intent information is extracted (116) and the satisfaction index is evaluated (118). An intent sate in an intent state machine (ISM) is a quadruple <SI, PSI, PVI, BSI> wherein SI depicts the satisfaction level, PSI depicts product/service specific intent level, PVI depicts product/service variation intent level, and BSI depicts brand specific intent level. ISM depicts the intent state transitions over a period time through multiple transactions. Based on input transaction, feedback, and the extracted intent information, ISM is suitably updated (120). Based on input transaction, updated ISM information is extracted (122) and further, current intent state information is retrieved (124).

FIG. 2 depicts a typical customer interaction scenario with a contact center agent. Observe that the agent realizes the intent state of the customer (that the customer is not happy) and quickly resolves the customer issues and makes a suitable promotional offer to win back the customer.

FIG. 3 depicts a typical workflow in evaluating customer satisfaction index and updation of ISM. Note that the suggested resolutions are based on intentional and contextual information and the objective is to try to improve satisfaction level.

FIG. 4 depicts the possible intent states. Observe that a value of −1 indicates a highly negative state while +1 indicates a highly positive state with intermediate values depicting varying satisfaction levels.

FIGS. 5 and 6 provide a brief description of various intent parameters, their description and a computation procedure to compute their value. Note that the computational procedures make use of suitably defined threshold values. Observe that the intent parameters from 1 through 8 are related to product/service satisfaction level and are used to compute product/service specific intent (PSI) level. Similarly, the intent parameters 9 through 12 are related to product/service variation intent (PVI) level. Finally, the intent parameters 13 through 17 are related to brand specific satisfaction level and are used to compute brand specific intent (BSI) level.

FIG. 7 provides a procedure for intent capturing. Intent is captured and refined on a continuous basis as more and more transactions occur and both capturing and refinement are based on a set of intent parameters. The value of these parameters are computed based on the input transaction, context of the transaction, and the related interactions. The input transaction is received (700) and the value for various context parameters, such as date, time, mode of contact, location, purpose of contact, resolutions suggested, waiting time, resolution time, status of previous queries, and agent/customer feedback, are obtained (702). In order to assess the level of customer satisfaction, product/service specific intent parameters are obtained (704). The value for intent parameters, such as positive transaction count, negative transaction count, total transaction count, intensity of positive count, intensity of negative state, maximum intensity attained, number of pending queries, and total number of tasks are computed (706). In order to assess the level of product/service loyalty, product/service specific variation intent parameters are obtained (710). The value of intent parameters, such as number of products purchased of same brand, number of products/accessories purchased from competitors, number of comparison transactions, number of new product/service enquires, are computed (712). In order to assess the level of brand loyalty, brand specific intent parameters are obtained (720). The value of intent parameters, such as customer type (that includes agreement period), average waiting time, average resolution time, feedback factor, frequency of transactions, and received offers are computed (722). Based on these parameter values, the customer satisfaction index is computed (730).

FIG. 8 depicts a procedure for intent processing. The input transaction is received (800) and contextual parameter values are obtained (802). These contextual parameters include Time (T), Day (D), Mode of Contact (MOC), Location (LOC), Purpose of Contact (PC), Product Information (P), Query Information (Q), Waiting Time (W), Resolution Time (RT), Resolution Suggested (RS), Query Status (QS), and Feedback (F). N past ISM states, $S1, S2, \ldots, Sn$, are obtained where an intent state is a quadruple <SI, PSI, PVI, BSI> denoting the level of satisfaction, product/service specific intent level, product/service specific variation intent level, and brand specific intent level (804). Intent parameters such as PTC, NTC, TTC, IPS, INS, MI, NPT, TNT, NPS, NPC, NCT, NPE, CT, QSF, TSF, AWT, and ART are computed (806). Product/service specific intent level (PSI) is computed as follows (808): PSI=(((PTC−NTC)/TTC)+((IPS−INS)/MI)−(NPT/TNT))/3. Product/service specific variation intent level (PVI) is computed as follows (810): PVI=(w1*NPS)−(w2*NPC)−(w3*NCT)+(w4*NPE). Brand specific intent level (BSI) is computed as follows (812): BSI=(w1*CT)+(w2*QSF)+(w3*TSF)+(w4*AWT)+(w5*ART). Recent past intent factor (RP) is computed as follows (814): RP=Average of <PSI', PVI', BSI'> associated with last N transactions. Compute SI based on PSI, PVI, BSI, and RP as follows (816): SI=(PSI+PVI+BSI+RP)/4. The next intent state in ISM is updated as Sn=<SI, PSI, PVI, BSI> (818).

FIG. 9 depicts an illustrative ISM. Observe that the intent states in the ISM reflect the satisfaction level and based on this information, additional effort is put to win back the confidence of the customer. This is indicated by the swinging of the customer satisfaction level from more negative to slightly positive to more positive.

FIG. 10 depicts a typical customer satisfaction level flow. One of the objectives of the present invention is to help track a customer's intents. These intents are on account of behavioral loyalty and mental loyalty exhibited by the customer towards a brand /product/service. Intent based adaptive services make use of tracked intents of the customer to help process transactions in a better way. One single parameter of focus is customer satisfaction index which is computed during the course of the processing of a transaction and increasing values of satisfaction index would act like a positive feedback resulting multiple purchases while decreasing values lead to successive negative feedback ultimately resulting in churn.

FIG. 11 provides an illustrative interactions of a customer. In this illustration, the customer buys a product and faces certain problems with the same leading to dissatisfaction. CSTS highlights this dissatisfaction to an agent dealing with the customer and the agent makes an additional discount offer on a product apart from suggesting suitable resolutions that would remove most of the problems being faced by the customer. Such resolutions lead to the purchase of the new product and at the same time increasing the satisfaction level of the customer.

FIG. 12 provides an illustrative updation of ISM. In this illustration, the various measures required to compute the satisfaction index during a series of interactions of a customer with an agent of a contact center are shown. Observe how a suitable reaction by the agent ultimately takes the satisfaction index to a positive value.

Thus, a system and method for tracking customer satisfaction levels based on a set of intent and context parameters whose values derived based on customer interactions is disclosed. Although the present invention has been described particularly with reference to figures, it will be apparent to one of the ordinary skill in the art that the present invention may appear in any number of systems that perform the assessing of customer intents. It is further contemplated that many changes and modifications may be made by one of ordinary skill in the art without departing from the spirit and scope of the present invention.

What is claimed is:

1. A method for tracking a satisfaction level of a customer by computing a customer satisfaction index of the customer when a product of a brand from a manufacturer is bought and used based on a plurality of transactions of the customer associated with the product of the brand and a plurality of intent parameters, the method comprising the steps of:
   (a) retrieving from a database the plurality of intent parameters including:
      a positive transaction count (PTC);
      a negative transaction count (NTC);
      a total transaction count (TTC);
      an intensity of positive state (IPS);
      an intensity of negative state (INS);
      a maximum intensity attained (MI);
      a number of pending tasks (NPT);
      a total number of tasks (TNT);
      a number of products purchased of same brand (NPS);
      a number of products purchased from competitors (NPC);
      a number of comparison transactions (NCT);
      a number of new product enquiries (NPE);
      a customer type (CT);
      a query satisfaction factor (QSF);
      a transaction satisfaction factor (TSF);
      an average waiting time (AWT); and
      an average resolution time (ART);
   (b) computing via an intentional context processor subsystem:
      a product specific intent (PSI) level based on the plurality of intent parameters and the plurality of transactions;
      a product variation intent (PVI) level based on the plurality of intent parameters and the plurality of transactions; and
      a brand specific intent (BSI) level based on the plurality of intent parameters and the plurality of transactions;
   (c) computing via a satisfaction index evaluator subsystem:
      a recent past intent (RP) factor based on a plurality of PSI levels, a plurality of PVI levels, and a plurality of BSI levels associated with the plurality of transactions; and
      the customer satisfaction index (SI) based on the PSI level, the PVI level, the BSI level, and the RP factor;
   (d) obtaining via an ISM updater subsystem an intent state machine (ISM) associated with the customer, wherein the ISM comprises a plurality of intent states; and
   (e) updating via the ISM updater subsystem the ISM based on an intent state of the plurality of intent states, the PSI level, the PVI level, the BSI level, and the SI.

2. The method of claim 1, wherein the PSI levels are computed by:
   (a) computing a waiting time value based on the plurality of transactions;
   (b) computing a resolution time value associated based on the plurality of transactions;
   (c) computing a number of positive resolutions based on a plurality of resolutions suggested (RS) based on the plurality of transactions;
   (d) computing a query status (QS) value based on the plurality of transactions;
   (e) computing a PTC value associated with the PTC based on the waiting time value being less than a predefined waiting time threshold, wherein the resolution time value is less than a predefined resolution time threshold, the number of positive resolutions, and the QS value;
   (f) computing a number of negative resolutions based on the plurality of RS;
   (g) computing an NTC value associated with aid NTC based on the waiting time value being greater than the predefined waiting time threshold, the resolution time value being greater than the predefined resolution time threshold, the number of negative resolutions, and the QS value;

(h) computing a TTC value associated with the TTC based on the PTC value and the NTC value;

(i) computing an IPS value associated with the IPS based on a plurality of positive states associated with the plurality of transactions;

(j) computing an INS value associated with the INS based on a plurality of negative states associated with the plurality of transactions;

(k) computing an MI value associated with the MI based on the IPS value and the INS value;

(l) computing an NPT value associated with the NPT based on the plurality of transactions;

(m) computing a TNT value associated with the TNT based on the plurality of transactions; and (n) computing the PSI level based on the PTC value, the NTC value, the TTC value, the IPS value, the INS value, the MI value, the NPT value, and the TNT value.

3. The method of claim 1, wherein the the PVI levels are computed by:

(a) computing a number of buy resolutions based on a plurality of resolutions suggested (RS) based on the plurality of transactions;

(b) computing an NPS value associated with the NPS based on the number of buy resolutions;

(c) computing a number of competition buy query status (QS) values based on the plurality of transactions;

(d) computing an NPC value associated with the NPC based on the number of competition buy QS values;

(e) computing a number of comparison transactions based on the plurality of transactions;

(f) computing an NCT value associated with the NCT based on the number of comparison transactions;

(g) computing a number of product enquiries based on the plurality of transactions;

(h) computing an NPE value associated with the NPE based on the number of product enquiries; and (i) computing the PVI level based on the NPS value, the NPC value, the NCT value, and the NPE value.

4. The method of claim 1, wherein the the BSI levels are computed by:

(a) obtaining a CT value associated with the CT based on information associated with the customer;

(b) computing a number of query requests based on the plurality of transactions;

(c) computing a number of query resolutions based on the plurality of transactions;

(d) computing of a QSF value associated with the QSF based on the number of query resolutions and the number of query requests;

(e) computing a number of positive transactions based on the plurality of transactions;

(f) computing a number of negative transactions based on the plurality of transactions;

(g) computing a TSF value associated with the TSF based on the number of positive transactions and the number of negative transactions;

(h) computing an AWT value associated with the AWT based on the plurality of transactions;

(i) computing an ART value associated with the ART based on the plurality of transactions;

(j) computing the BSI level based on the CT value, the QSF value, the TSF value, the AWT value, and the ART value.

* * * * *

UNITED STATES PATENT AND TRADEMARK OFFICE
CERTIFICATE OF CORRECTION

PATENT NO. : 7,801,761 B2  
APPLICATION NO. : 11/293450  
DATED : September 21, 2010  
INVENTOR(S) : Varadarajan et al.

Page 1 of 1

It is certified that error appears in the above-identified patent and that said Letters Patent is hereby corrected as shown below:

Column 7, line 22, Claim 3, "the the PVI levels" should read -- the PVI levels --

Column 8, line 9, Claim 4, "the the BSI levels" should read -- the BSI levels --

Signed and Sealed this
First Day of February, 2011

David J. Kappos
*Director of the United States Patent and Trademark Office*